(12) United States Patent
Ressemann et al.

(10) Patent No.: US 9,241,777 B2
(45) Date of Patent: Jan. 26, 2016

(54) ANIMAL FEEDING APPARATUS

(71) Applicant: Chompers, LLC, Menlo Park, CA (US)

(72) Inventors: Thomas Ressemann, Edina, MN (US);
Matthew Ressemann, Edina, MN (US);
Ryan Ressemann, Edina, MN (US);
Suzanne Wortham-Ressemann, Edina, MN (US); Nancy Altena, St. Cloud, MN (US); Joshua Baltzell, Menlo Park, CA (US)

(73) Assignee: Chompers LLC, Menlo Park, CA (US)

( * ) Notice: Subject to any disclaimer, the term of this patent is extended or adjusted under 35 U.S.C. 154(b) by 0 days.

(21) Appl. No.: 14/511,295

(22) Filed: Oct. 10, 2014

(65) Prior Publication Data

US 2015/0020741 A1    Jan. 22, 2015

Related U.S. Application Data

(62) Division of application No. 13/969,848, filed on Aug. 19, 2013, now Pat. No. 8,919,288.

(60) Provisional application No. 61/696,622, filed on Sep. 4, 2012.

(51) Int. Cl.
| | |
|---|---|
| *A01K 5/01* | (2006.01) |
| *A01K 5/00* | (2006.01) |
| *A61D 5/00* | (2006.01) |
| *A01K 13/00* | (2006.01) |

(52) U.S. Cl.
CPC ............... *A61D 5/00* (2013.01); *A01K 5/0114* (2013.01); *A01K 13/00* (2013.01); *A01K 13/001* (2013.01); *A46B 2200/1086* (2013.01)

(58) Field of Classification Search
CPC ... A63B 47/04; A01K 5/0114; A01K 5/0121; A01K 13/001; A01K 13/00; A46B 2200/1086; A61D 5/00
USPC ........ 119/709, 61.5, 61.54, 51.01, 52.1, 61.3; D30/121, 129, 130
See application file for complete search history.

(56) References Cited

U.S. PATENT DOCUMENTS

| | | | | |
|---|---|---|---|---|
| 2,619,666 A * | 12/1952 | Hayes et al. | .................... | 15/179 |
| 3,491,724 A * | 1/1970 | Sunner | ........................ | 119/61.54 |
| 4,017,933 A * | 4/1977 | Aja et al. | ........................ | 15/21.2 |
| D296,020 S * | 5/1988 | McCarroll | ................... | D30/130 |
| 4,899,413 A * | 2/1990 | Trobiani | ........................ | 15/21.2 |
| D326,542 S * | 5/1992 | Bain, Jr. | ...................... | D30/129 |
| 6,112,698 A * | 9/2000 | Zelinger | .................... | 119/61.54 |
| 6,745,424 B1 * | 6/2004 | Pimentel et al. | ................ | 15/21.2 |
| D563,608 S * | 3/2008 | Kitchen | ........................ | D30/129 |
| D648,904 S * | 11/2011 | Tedaldi et al. | ................. | D30/129 |
| 2002/0185073 A1 * | 12/2002 | Fullerton et al. | ............ | 119/51.01 |
| 2004/0237901 A1 * | 12/2004 | Willinger et al. | ........... | 119/61.54 |
| 2004/0259460 A1 * | 12/2004 | Persall et al. | .................... | 446/20 |
| 2006/0005774 A1 * | 1/2006 | Newman Bornhofen | .... | 119/61.5 |
| 2006/0213447 A1 * | 9/2006 | Kitchen et al. | ................ | 119/61.5 |

(Continued)

*Primary Examiner* — Monica Williams
*Assistant Examiner* — Morgan T Barlow
(74) *Attorney, Agent, or Firm* — Troy Svihl; Craig J. Lervick; Larkin Hoffman Daly & Lindgren, Ltd.

(57) ABSTRACT

Animal feeding apparatuses that include a plurality of protrusions extending into a feeding well. The protrusions clean the teeth or gums of an animal as it feeds from the feeding well. Also described herein are methods of cleaning an animal's teeth with such a bowl and animals that feed from such a bowl.

18 Claims, 19 Drawing Sheets

(56) References Cited

U.S. PATENT DOCUMENTS

| | | |
|---|---|---|
| 2008/0072829 A1* | 3/2008 | Kerrigan et al. ............. 119/61.5 |
| 2008/0141945 A1* | 6/2008 | Markham .................... 119/61.5 |
| 2010/0012042 A1* | 1/2010 | Lee .............................. 119/61.5 |
| 2010/0077963 A1* | 4/2010 | Lipscomb et al. .............. 119/54 |
| 2011/0139076 A1* | 6/2011 | Pu et al. ..................... 119/51.02 |
| 2011/0303160 A1* | 12/2011 | Axelrod et al. ............... 119/709 |
| 2012/0279460 A1* | 11/2012 | Pang et al. .................... 119/709 |
| 2014/0165920 A1* | 6/2014 | Sarty et al. ...................... 119/72 |

\* cited by examiner

ANIMAL FEEDING APPARATUS

RELATED APPLICATIONS

This Application claims priority to U.S. Provisional Application No. 61/696,622, which was filed on 4 Sep. 2012 and entitled "Animal Feeding Apparatus for Promoting Oral Hygiene." This Application also claims priority to U.S. Utility application Ser. No. 13/969,848, which was filed on 19 Aug. 2013, published as U.S. Patent Application Publication No. 2014/0060442, and entitled "Animal Feeding Apparatus and Methods of Use." The entire teachings of both of these application are incorporated herein by reference.

BACKGROUND

Gingivitis is estimated to afflict nearly 80% of domestic animals (e.g., dogs and cats) that are at least 3 years old. Gingivitis develops when bacteria build up between the teeth and gums, leading to irritation, inflammation, and bleeding. Healthy gums fit tightly around the teeth, but in an animal with gingivitis rough dental calculus has built up along the gum line. This calculus forces gum tissue away from the teeth and creates small pockets where food and bacteria become trapped. In time, the gum becomes infected.

Dental calculus, also known as "tartar," is composed of calcium salts, food particles, bacterial, and other organic material. It is yellow-brown and soft when first deposited, though it quickly hardens into calculus. At this soft stage, it is sometimes referred to as "plaque."

The buildup of calculus on teeth is the primary cause of gum infection. Generally, current treatments includes periodic professional cleaning and polishing and regular brushing with a tooth brush and tooth paste. However, the professional treatments can be expensive and domestic pet owners are typically not very compliant with home brushing regiments.

A need exists for articles and methods that improve dental health in domestic animals.

SUMMARY

The subject matter of the present invention relates to an animal feeding apparatus that clean an animal's gum and teeth as they eat from the apparatus.

In some embodiments, the invention includes animal feeding apparatuses comprising a bowl that includes a base and a side wall, wherein the bowl defines a feeding well, and a plurality of protrusions extending into the feeding well from the base and from the side wall of the bowl.

In other embodiments, the invention includes animal feeding apparatuses comprising a bowl that includes a base and a side wall, wherein the bowl defines a feeding well, and a plurality of protrusions extending into the feeding well and configured to visibly deflect when an animal feeds from the well and presses against the protrusions.

In yet other embodiments, the invention includes methods of cleaning the teeth of a mammal, the method comprising providing an animal feeding apparatus described herein, directing food into the feeding well, and allowing a mammal to consume the food in the feeding well, wherein the protrusions clean the teeth of the mammal as the mammal consumes the food.

In still further embodiments, this invention includes an animal whose teeth are cleaned using any of the methods or animal feeding apparatuses described herein.

BRIEF DESCRIPTION OF THE FIGURES

The drawings, which are not necessarily drawn to scale, illustrate generally, by way of example, but not by way of limitation, the present invention.

DETAILED DESCRIPTION

Throughout the following description, specific details are set forth in order to provide a more thorough understanding of the invention. However, the invention may be practiced without these particulars. In other instances, well known elements have not been shown in the figures or described in detail in order to avoid unnecessarily obscuring the invention. These embodiments may be combined, other elements may be utilized or structural or logical changes may be made without departing from the scope of the invention. Accordingly, the specification is to be regarded in an illustrative, rather than a restrictive, sense.

The present invention relates to an animal feeding apparatus that provides for improved dental hygiene in animals that feed from the apparatus. The apparatus includes a feeding bowl that defines a feeding well. A plurality of protrusions extend into the feeding well from the bottom and/or side surfaces of the feeding well. When filled with animal feed (e.g., dog kibble), at least some of the feed falls between the protrusions. When an animal feeds from the well, the animal forces his teeth against the protrusions and the protrusions brush the animals teeth and gums, thereby providing a scrubbing action that cleans the animal's teeth.

Figure 1A:
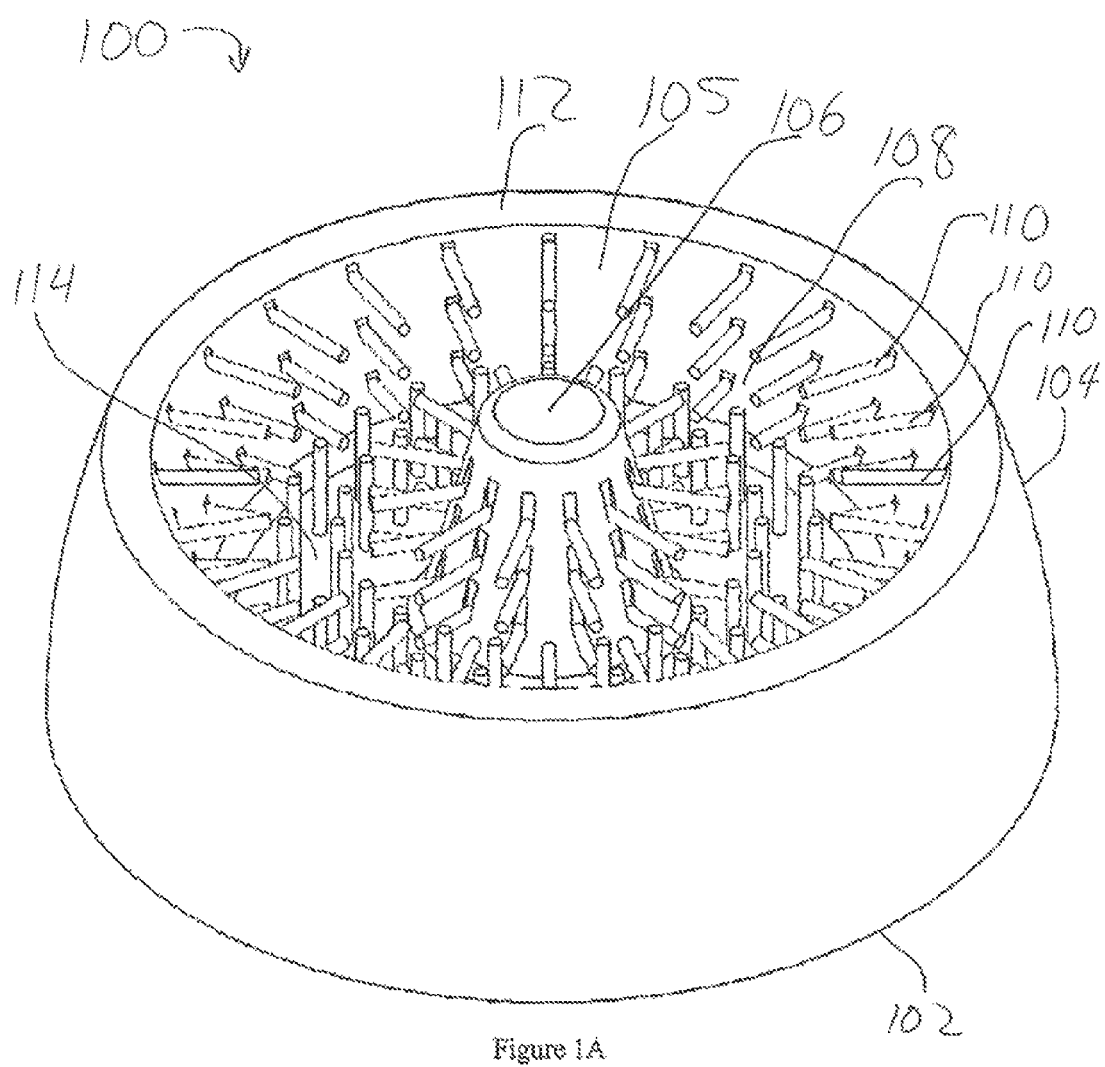
FIG. 1A illustrates a perspective view of the top of a bowl of the invention.
Figure 1B:
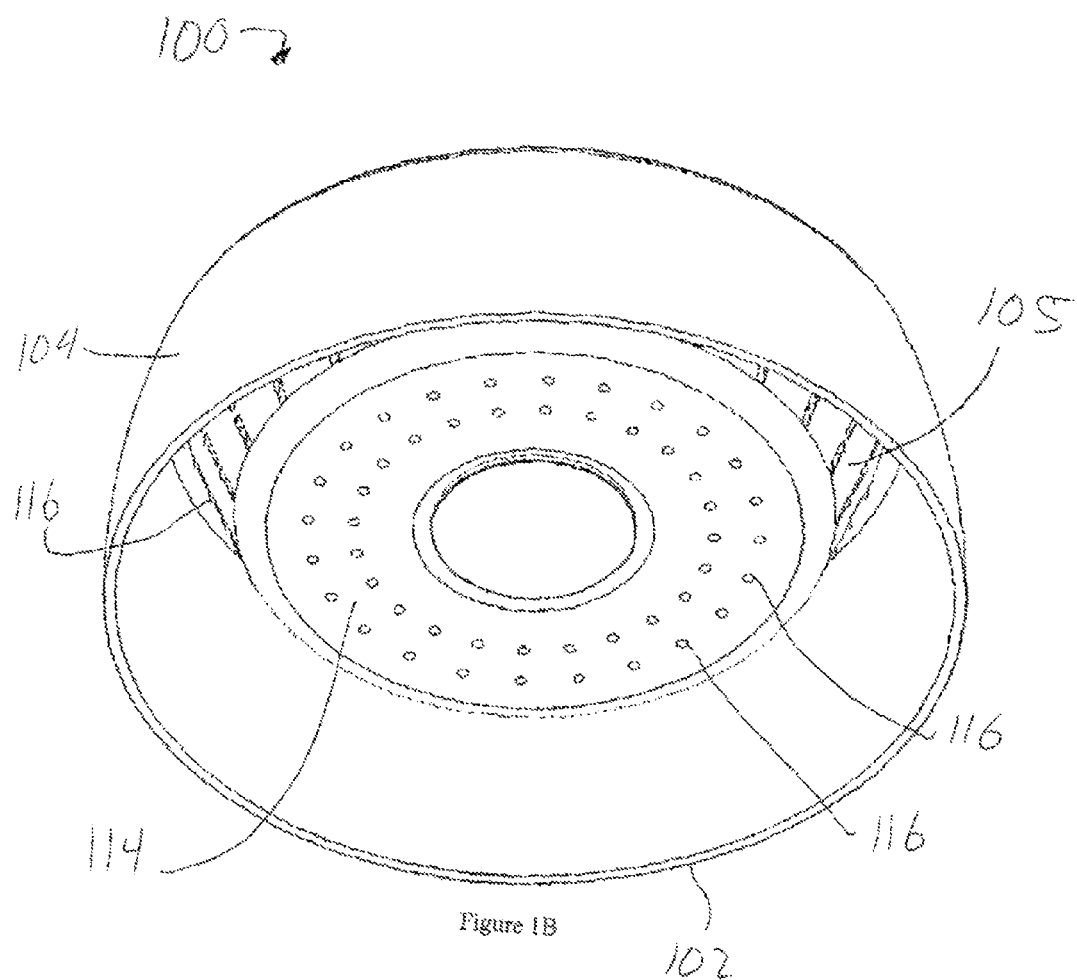
FIG. 1B illustrates a perspective view of the bottom of a bowl of the invention.
Figure 1C:
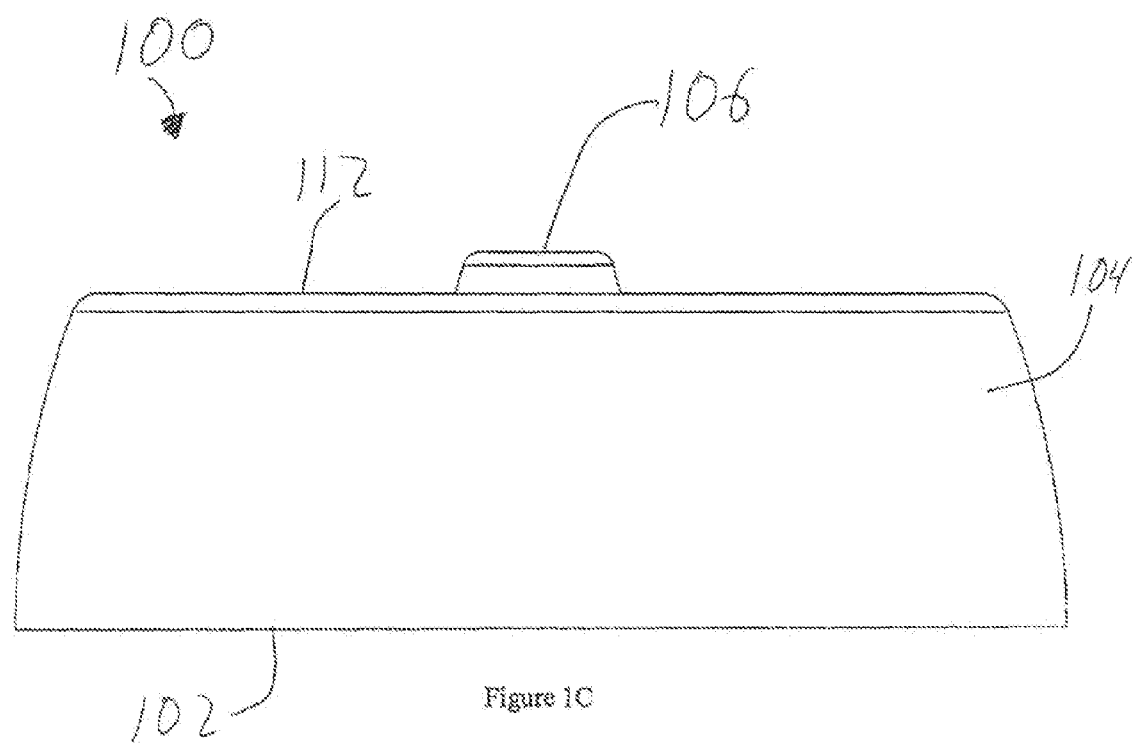
FIG. 1C illustrates a side elevation view of a bowl of the invention.
Figure 1D:
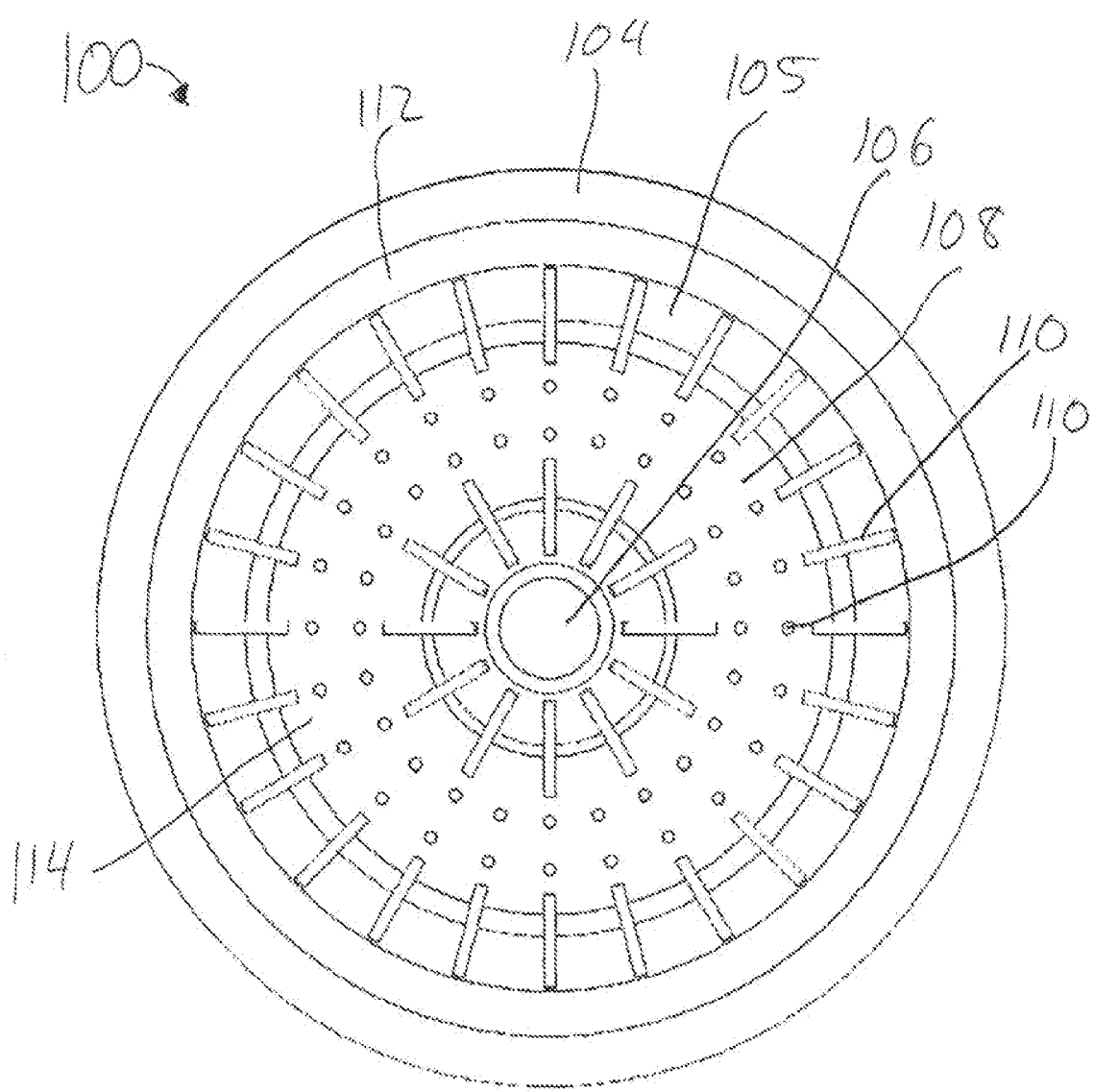
FIG. 1D illustrates a top view of a bowl of the invention.
Figure 1E:
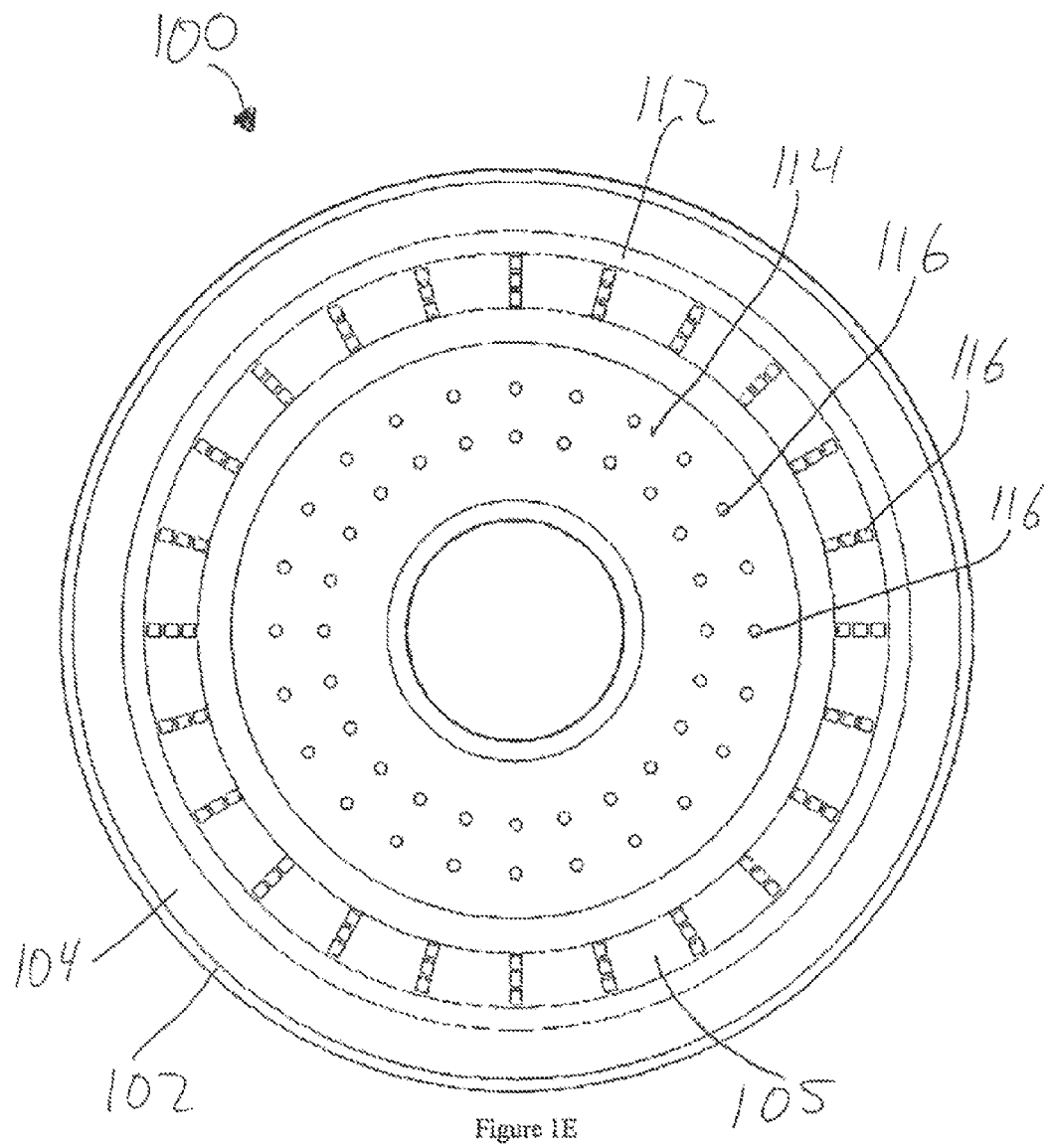
FIG. 1E illustrates a bottom view of a bowl of the invention.
Figure 1F:
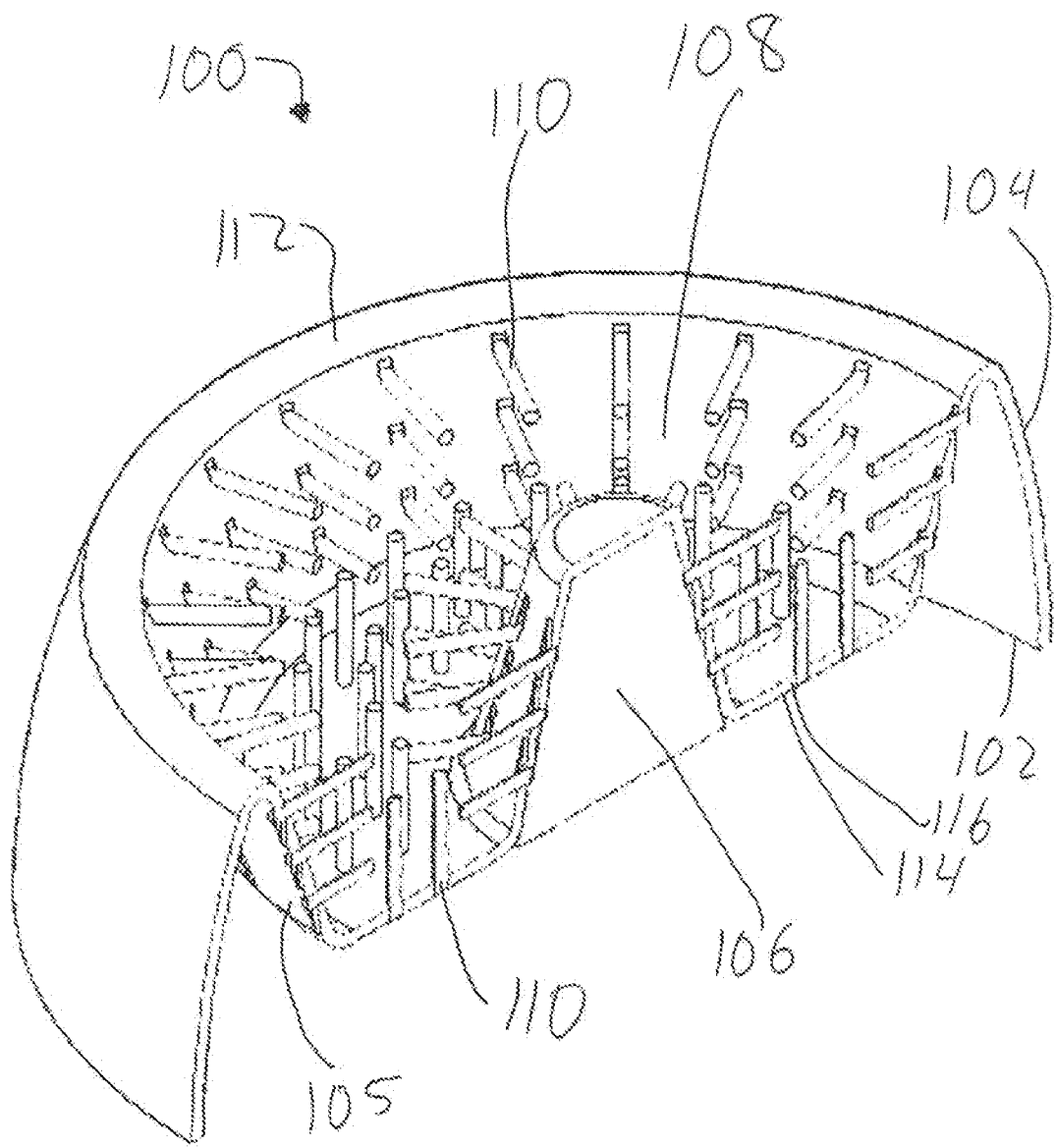
FIG. 1F illustrates a cross-sectional view of a bowl of the invention.

FIGS. 1A-1F illustrates various views of one embodiment of the present invention that includes a feeding apparatus in the form of bowl 100. FIG. 1A illustrates a perspective view of the top of bowl 100, while FIG. 1B illustrates a perspective view of the bottom of bowl 100. FIG. 1C illustrates a side elevation view of bowl 100. FIG. 1D illustrates a top view of bowl 100, while FIG. 1E illustrates a bottom view of bowl 100. FIG. 1F illustrates a cross-sectional view along plane I-I in FIG. 1A.

Bowl 100 includes base 102, outer side wall 104, and central hub 106. Bowl 100 defines feeding well 108. A plurality of protrusions 110 extend into feeding well 108.

Base 102 is circular and formed by the bottom surfaces of outer side wall 104, as can be seen in FIG. 1F. Base 102 is configured to rest on a flat surface, thereby providing support and a foundation for bowl 100.

Outer side wall 104 extends from base 102 up to rim 112 of bowl 100 Inner side wall 105 extends from rim 112 down to bottom 114 of feeding well 108, thereby defining the outer peripheral boundary of feeding well 108. Bottom 114 of feeding well 108 extends circumferentially from central hub 106 to the bottom portion of inner side wall 105, thereby defining the floor of feeding well 108. Central hub 106 extends up into feeding well 108, thereby defining a central inner boundary of feeding well 108. As shown in FIG. 1C, central hub 106 extends up such that its top surface stands proud above rim 112, though in other embodiments of the invention the central hub only extends such that its top surface of the central hub is coplanar with the rim or is below the rim.

A plurality of protrusions 110 extend into feeding well 108. Protrusions 110 extending into feeding well 108 from the surfaces of inner side wall 105, bottom 114, and central hub 106. Protrusions 110 provide a cleaning action to the teeth of an animal that feeds from well 108. While bowl 100 includes protrusions 110 extending from all three of the surfaces of inner side wall 105, bottom 114, and central hub 106, in some alternative embodiments of the invention the protrusions only extend from one or two of those three surfaces.

Each protrusion 110 includes a proximal portion that extends through a hole 116 in one of inner side wall 105, bottom 114, or central hub 106. The proximal portions of a given protrusion 110 are secured within a hole 116 via a friction fit. For example, the proximal portions may include an anchoring portion (not illustrates) that is slightly oversized compared to the size of the hole. In another example, a proximal portion of a protrusion may include flanges that are secured on either side of a given hole or a proximal portion of a protrusion may be secured to the bowl via an adhesive. In another example, the protrusions may be formed as a unitary structure with the other portions of the bowl.

While bowl 100 is shown to have a circular profile, with base 102 and feeding well 108 defining a circular profile, other embodiments of the present invention include non-circular profiles (e.g., a square profile or other parallelogram or rectilinear-shaped profiles, triangular-shaped profiles, ovular-shaped profiles, or other polygonal-shaped profiles). In some embodiments, the base of the bowl is less than 0.75 meters wide.

The various portions of the bowl can be made of a metal, a polymer, or combinations thereof. For example, the side walls or central hub made be made of metal while the protrusions are formed of a polymeric material. In some embodiment, the entire bowl (including the protrusions) is made of polymeric material.

In some embodiments of the invention, the protrusions are constructed to be partially flexible so that they at least partially flex when an animal's muzzle presses up against them. In some embodiments of the invention, the protrusions are between about 0.9 centimeters to about 3.2 centimeters long. In other embodiments, the protrusions are between about 1.2 centimeters to about 3.2 centimeters long. In further embodiments, the feeding apparatus includes protrusions of different lengths (e.g., a bowl could include two or more different species of protrusions, where each species extends a different length into the feeding well).

In some embodiments of the invention, the protrusions are made from a material or constructed such that they have a hardness of between about 30 D and about 80 D or from between about 50 D and about 70 D (on the ASTM D2240 type D durometer scale). In further embodiments of the invention, the feeding apparatus includes protrusions configured to have different hardness values (e.g., a bowl could include two more difference species of protrusions, where each species is made of a material or constructed such that they have a hardness dissimilar to the other species of protrusions).

The protrusions are generally spaced apart sufficiently so that individual portions of animal food may fit between them. Depending upon the size of the food used, it may be advantageous to space protrusions so they are more or less densely packed. For example, a feeding apparatuses for small dogs or cats may be used with dog or cat kibble particles that are about 0.5 centimeters in diameter, while feeding apparatuses for large animals may need to accommodate kibble that is about 2.5 centimeters in diameter. In some embodiments, the proximal portions of the protrusions are spaced apart from one another by a distance of between about 0.5 centimeters to about 2.6 centimeters.

As illustrated in embodiment shown in FIG. 1, the protrusions 110 have a circular cross-sectional shape. However, protrusions having other cross-sectional shapes may be desired in some applications. For example, some species or breeds of animals may get a superior result from protrusions shaped differently compared to other species or breeds. Further, some teeth (e.g., molars) may be cleaned better by one shape of protrusions than another. Hence, in some embodiments of the invention, the protrusions define an ovular, triangular, square, or other rectilinear cross-sectional shape. In further embodiments, the bowls of the invention can include protrusions having more than one type of cross-sectional shape. For example, protrusions extending from an inner side wall may define a first cross-sectional shape while protrusions extending from the bottom of the feeding well or from a central hub may define a second or third cross-sectional shape that are dissimilar to the first cross-sectional shape. In some embodiments, the protrusions define a cross-sectional shape having a major dimension of between about 0.15 centimeters to about 0.7 centimeters. In other embodiments, the protrusions define a cross-sectional shape having a major dimension of between about 0.25 centimeters and about 0.4 centimeters. In yet further embodiments, the protrusions define a cross-sectional shape having a major dimension of about 0.3 centimeters.

In some embodiments, the protrusions have a length to radial-thickness ratio (that is, the ratio of the distance a protrusion extends into the feeding well to the width of the protrusion) of between about 22:1 and about 1:1 while in further embodiments the ratio may be between about 20:1 and about 2:1. In yet further embodiments, the protrusions have a length to radial-thickness ratio of about 8:1. In further embodiments, a bowl includes protrusions having two or more different length to radial-thickness ratios. In yet further embodiments, one or more of the protrusions in a bowl define a first radial thickness at a first location and a second radial thickness at a second location, wherein the first radial thickness is greater than the second radial thickness. In some embodiments, the first location is more proximal (i.e., closer to the bowl surface from which it extends) than the second location.

In some embodiments one or more of the protrusions of a bowl includes bristles extending from the outer surface of the protrusion. In further embodiments, one or more protrusions of a bowl include a surface with texturing (e.g., ridges).

In some embodiments of the invention, one or more of the protrusions extend at an acute angle relative to the surface of the inner side wall, the bottom of the feeding well, or the central hub from which it extends. In further embodiments of the invention, one or more of the protrusions extend at a right angle relative to the surface of the inner side wall, the bottom of the feeding well, or the central hub from which it extends.

In some embodiments of the invention, one or more of the protrusions includes a flavoring agent (e.g., a meat flavoring), a cleaning agent (e.g., tooth paste), a polishing agent, or a pharmaceutical agent.

In some embodiments of the invention, the bowl does not include a central hub and the projections extend from all or part of an inner side wall or all or part of the bottom of a feeding well. In other embodiments of the invention, the bowl includes a removable central hub that can be removed without destroying or deforming the other portions of the bowl. For example, a removable central hub may be secured to the bowl via a screw attachment or a friction fit.

Figure 2A:
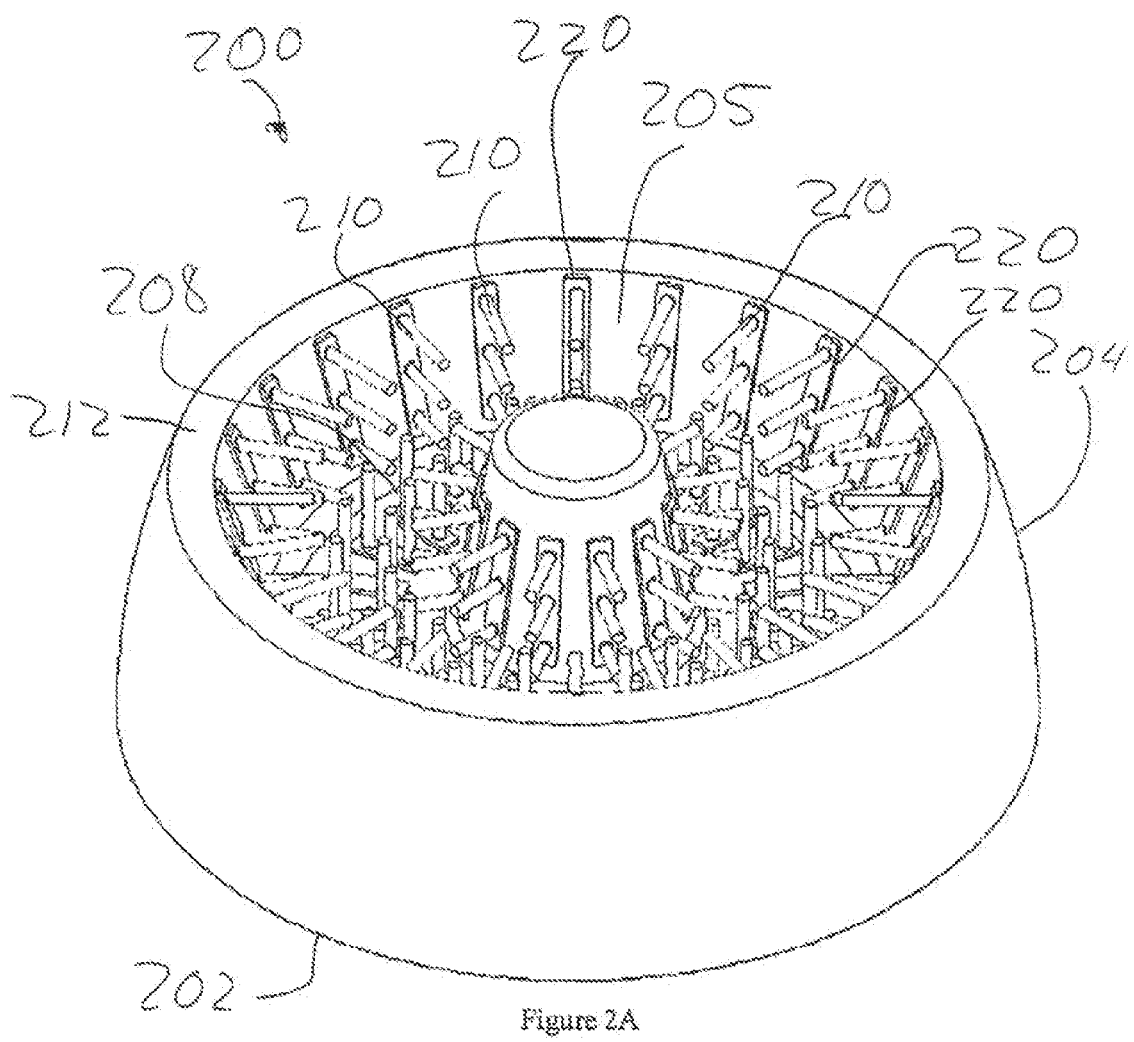
FIG. 2A illustrates a perspective view of the top of a bowl of the invention.
Figure 2B:
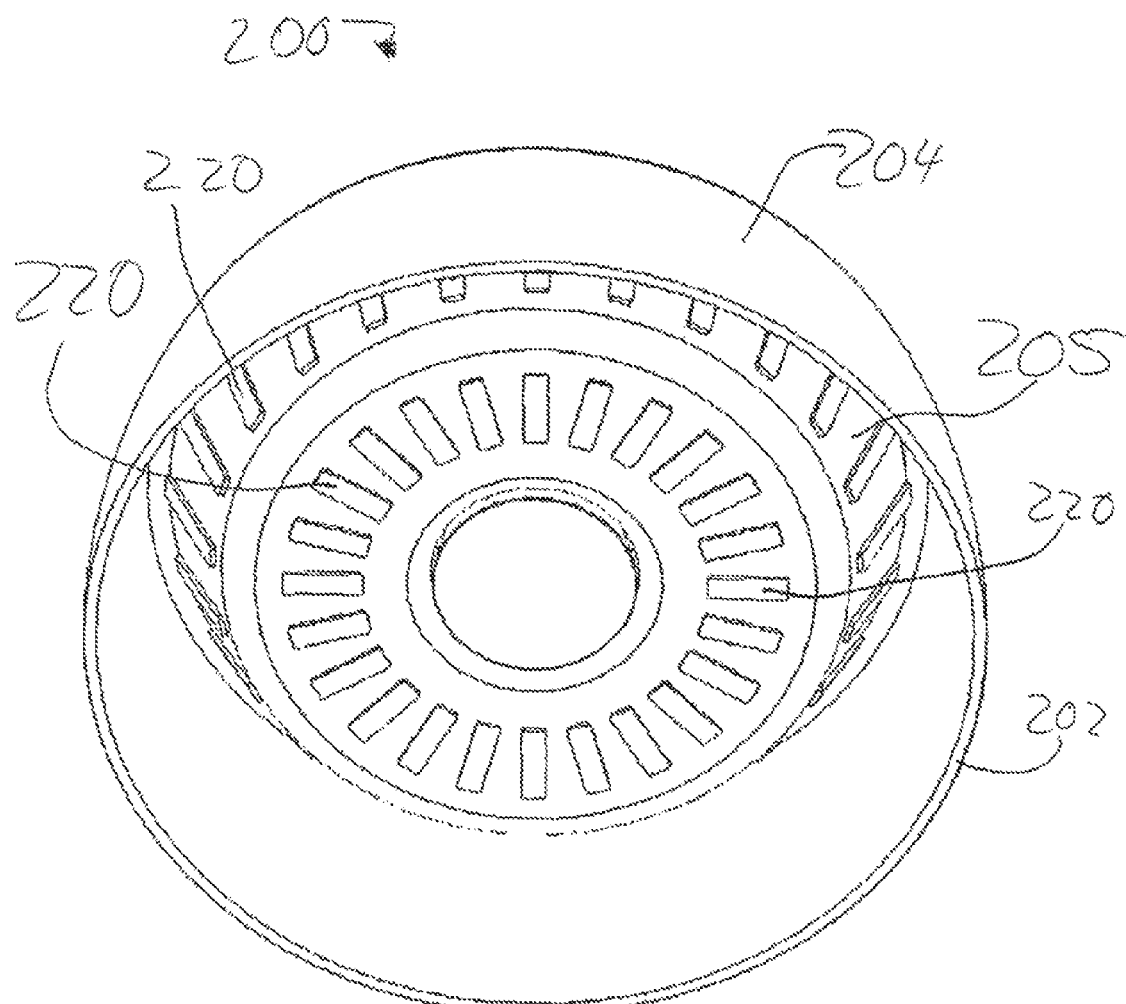
FIG. 2B illustrates a perspective view of the bottom of a bowl of the invention.
Figure 2C:
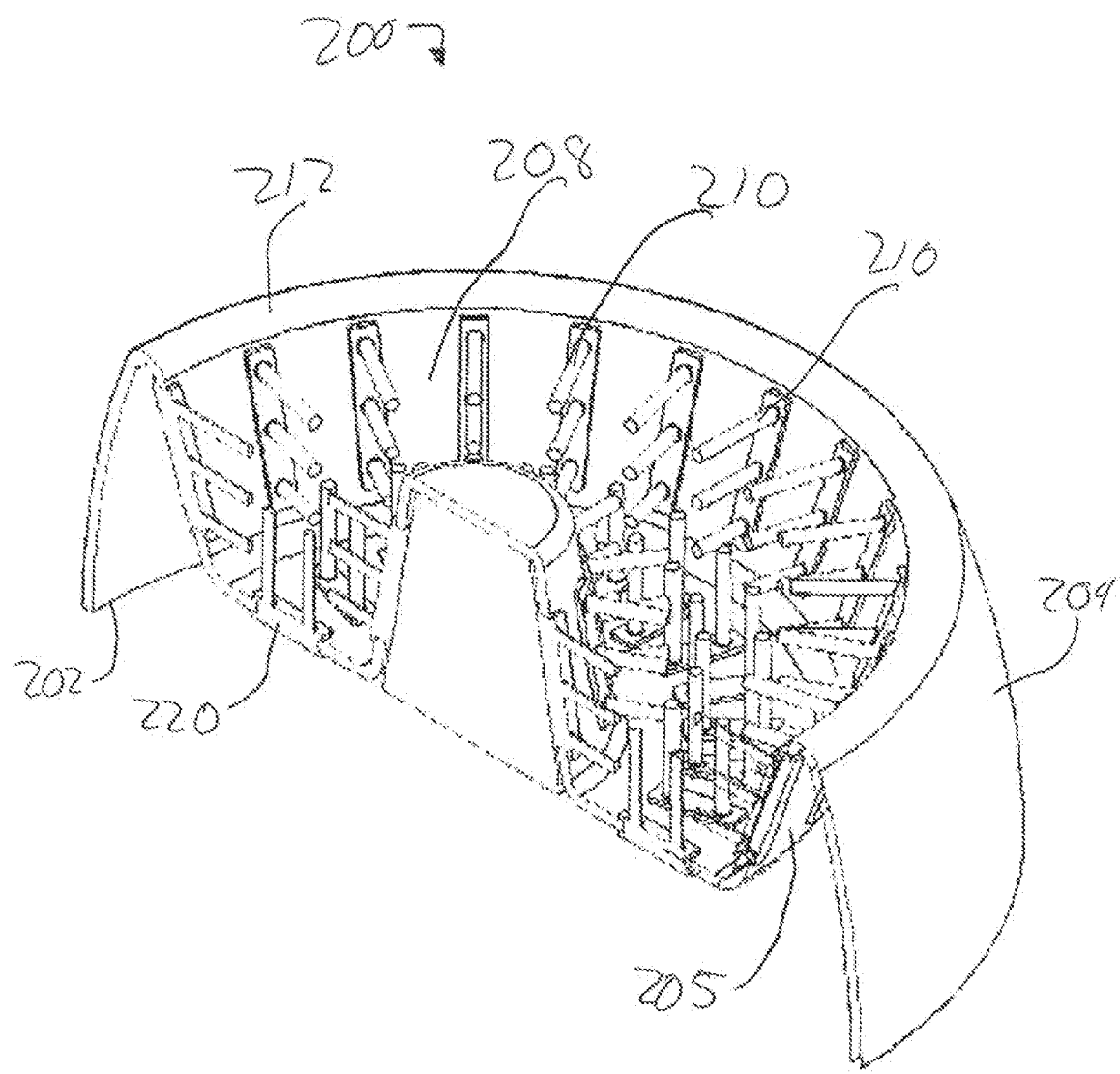
FIG. 2C illustrates a cross-sectional view of a bowl of the invention.

In some embodiments of the invention, the bowl includes strips that are easily replaced when worn. For example, FIGS. 2A-2C illustrate another embodiment of the invention that includes bowl 200. Bowl 200 is similar in many respects to bowl 100 and includes base 202, outer side wall 204, inner side wall 205, a plurality of protrusions 210 extending into feeding well 208, rim 212. However, one difference between bowl 200 and bowl 100 is that protrusions 210 of bowl 200 are formed into strips 220 of three protrusions 210 each. That is, three neighboring protrusions 210 are formed from a single longitudinal strip 220 of material. Rather than replacing each protrusion 210 individually, strips 220 allow for easy replacement of three protrusions 210 at a time as they are worn or damaged from use. Strips 220 are held in place in bowl 200 via flanges on the proximal end of each strip 220.

Figure 3A:
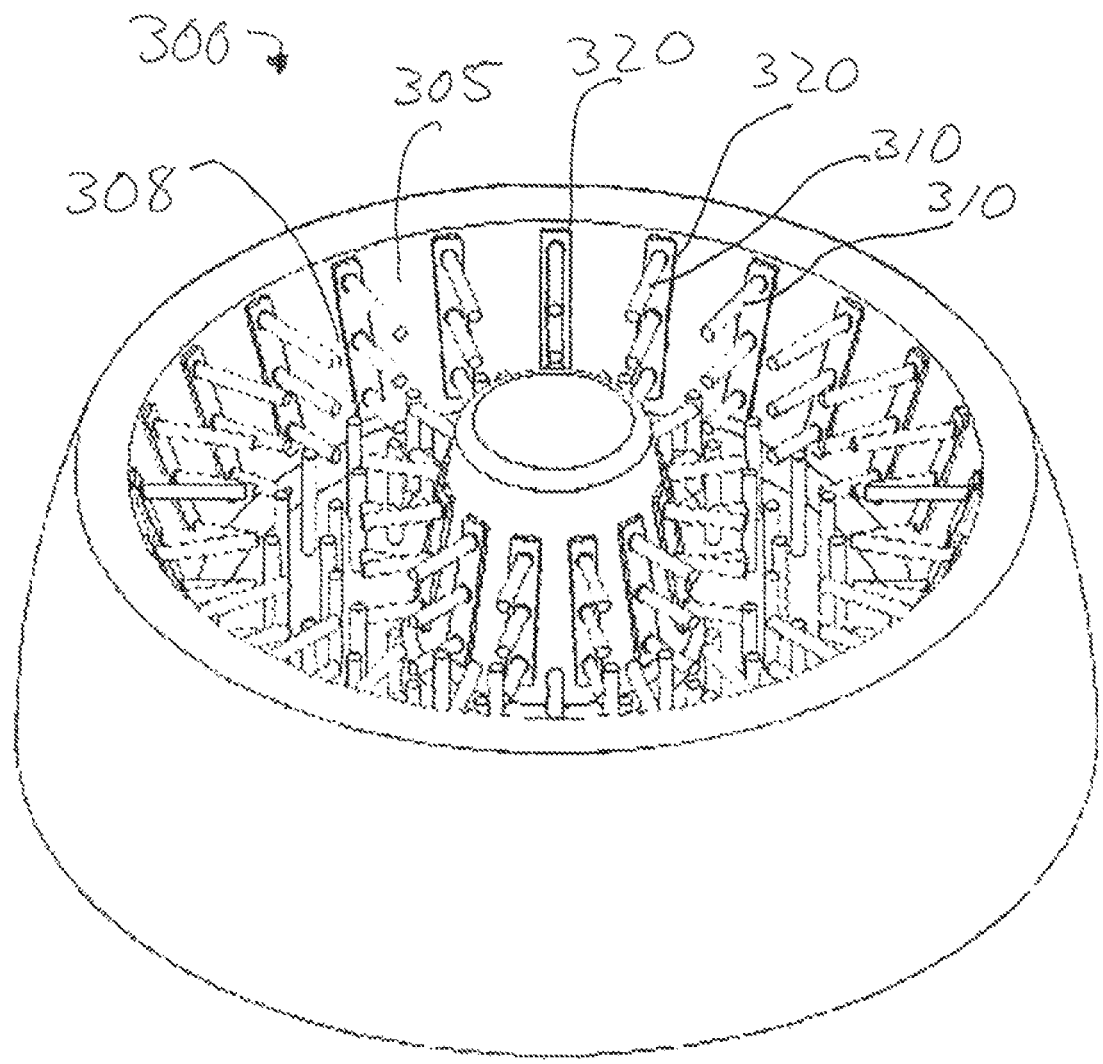
FIG. 3A illustrates a perspective view of the top of a bowl of the invention.
Figure 3B:
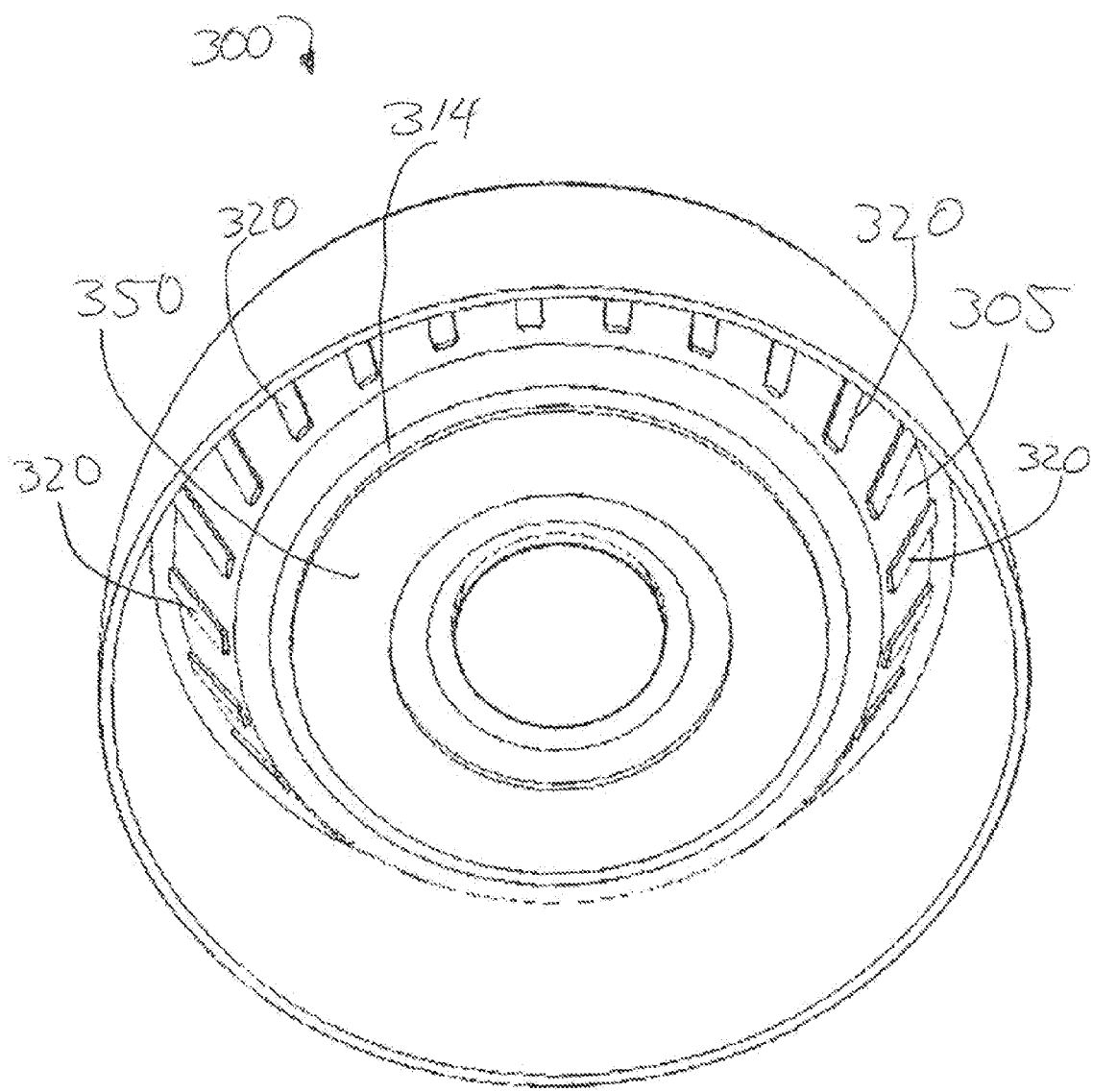
FIG. 3B illustrates a perspective view of the bottom of a bowl of the invention.
Figure 3C:
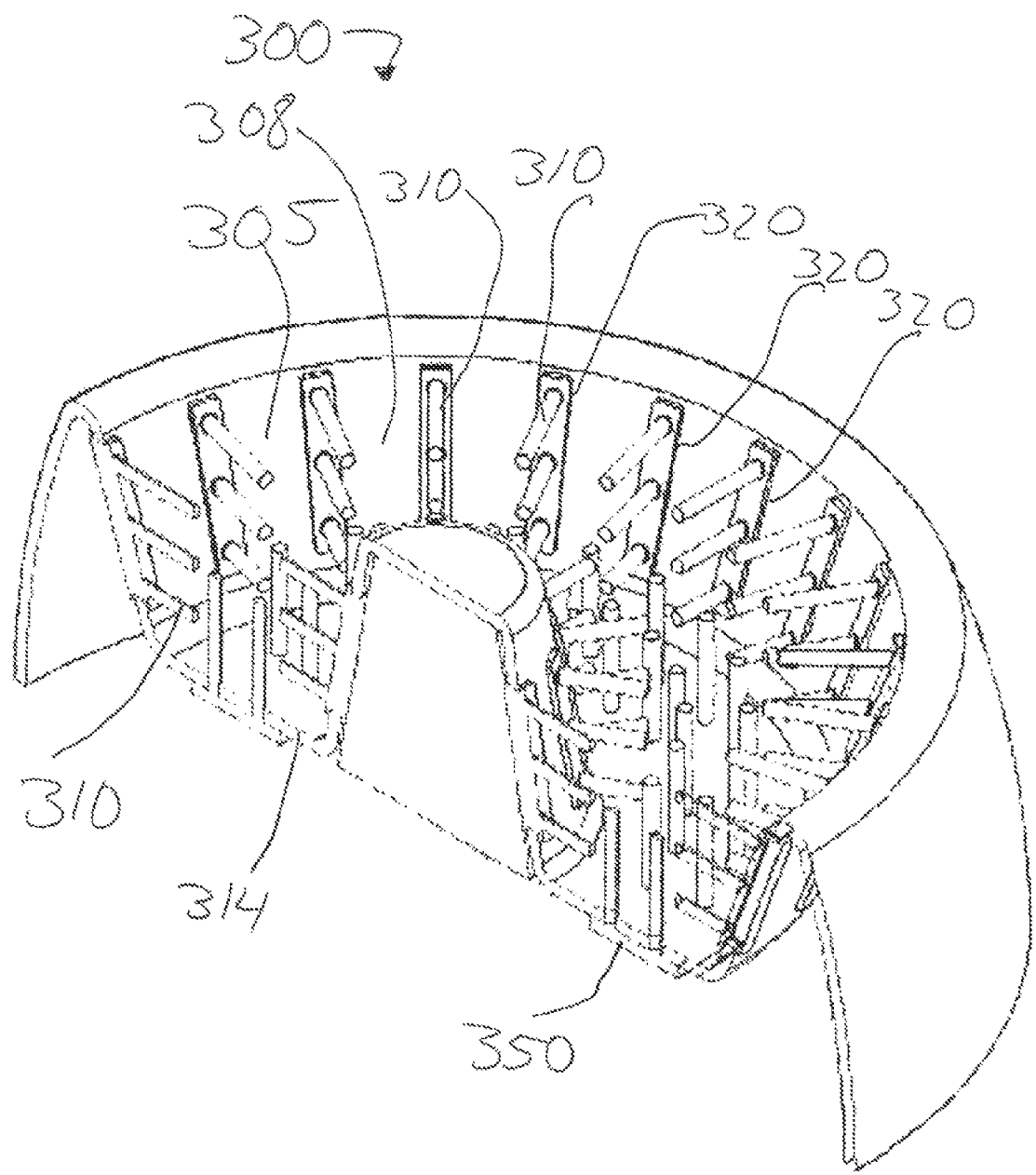
FIG. 3C illustrates a cross-sectional view of a bowl of the invention.

While bowl 200 includes strips 220 of three protrusions 210 each, in some embodiments of the invention includes agglomerations of even more protrusions. For example, bowl 300, shown in FIGS. 3A-3C includes strips 320 of three protrusions 310 each on inner side wall 305. In addition, all of protrusions 310 extending from bottom 314 of feeding well 308 are formed from a single portion of material in the form of ring 350. Ring 350 can be exchanged when its protrusions 310 are worn or damaged. In this way ring 350 provides for easy replacement of all protrusions 310 extending from bottom 314. Ring 350 is held in place in bowl 300 via a friction fit.

Figure 4A:
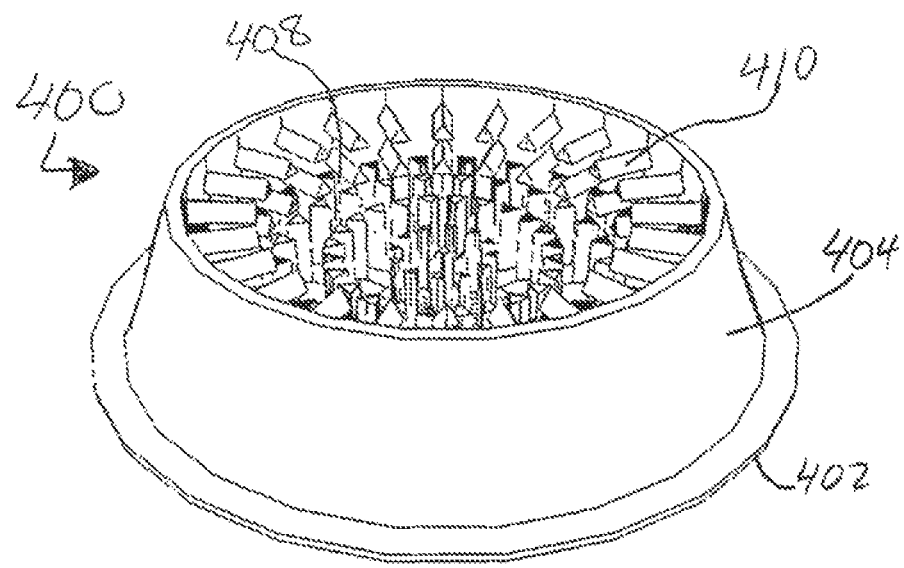
FIG. 4A illustrates a perspective view of a bowl of the invention.
Figure 4B:
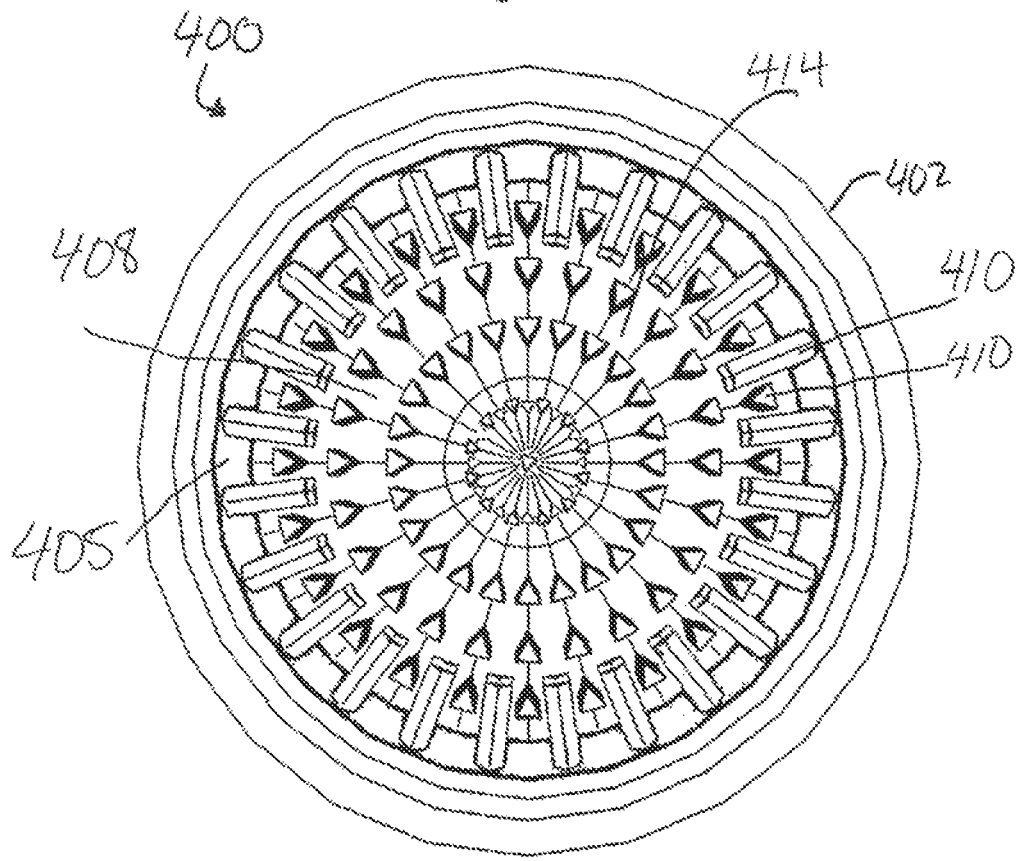
FIG. 4B illustrates a top view of a bowl of the invention.

Yet another embodiment of the invention is illustrated in FIGS. 4A and 4B which show a feeding apparatus in the form of bowl 400. FIG. 4A illustrates a perspective view of bowl 400 while FIG. 4B illustrates a top view of bowl 400. Bowl 400 includes base 402, outer side wall 404 and a plurality of protrusions 410 extending into feeding well 408. Bowl 400 lacks a central hub, so protrusions 410 extend into feeding well 408 only from the surfaces of inner side wall 405 and bottom 414. Protrusions 410 have a triangular cross-sectional shape.

Figure 5A:
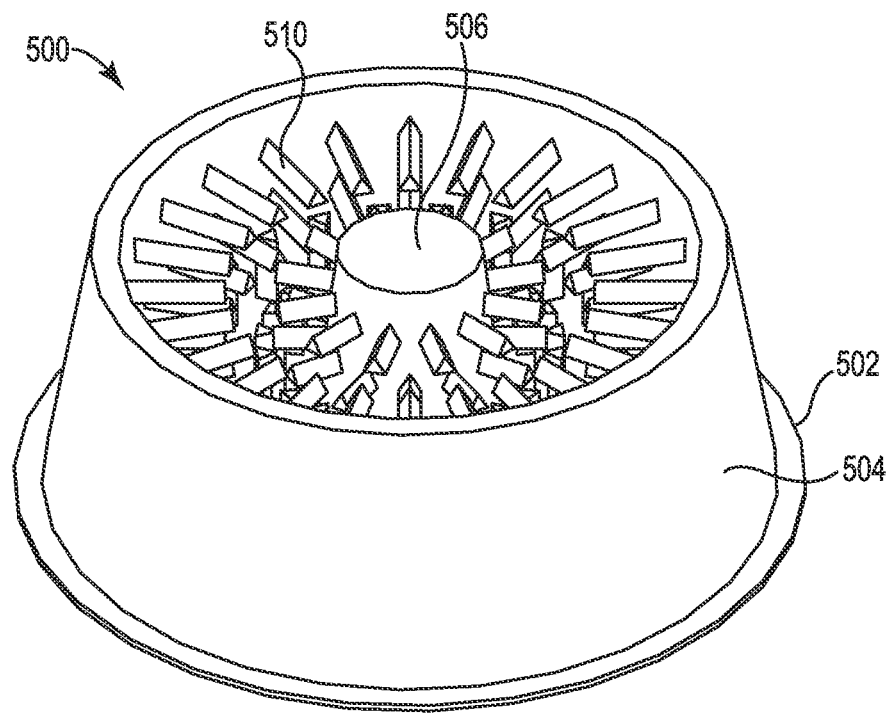
FIG. 5A illustrates a perspective view of a bowl of the invention.
Figure 5B:
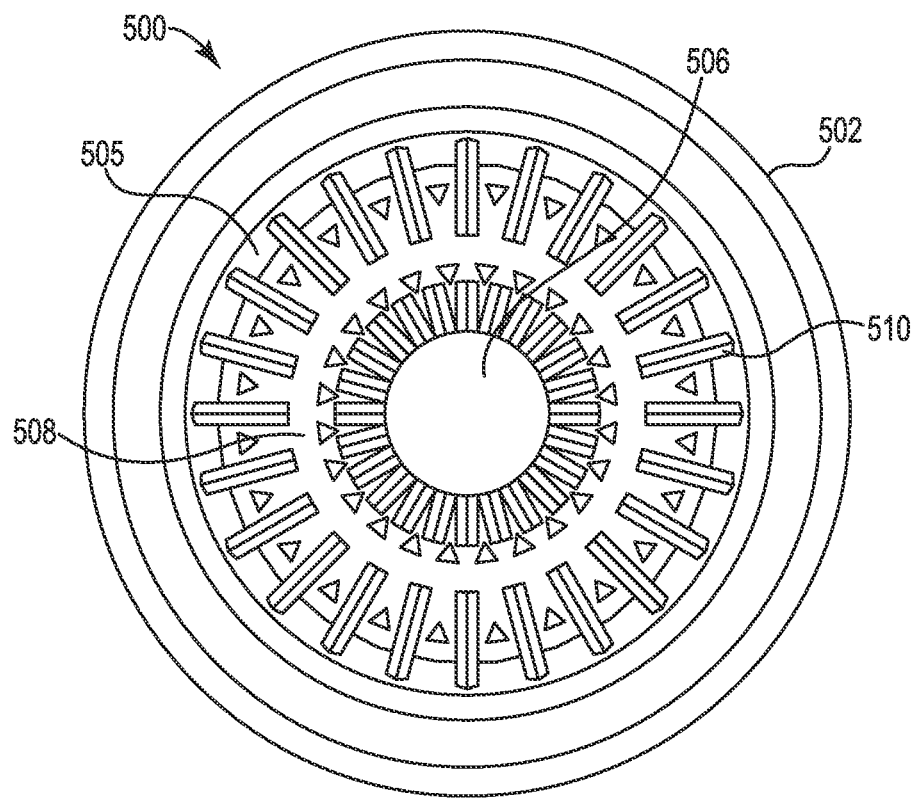
FIG. 5B illustrates a top view of a bowl of the invention.

Yet another embodiment of the invention is illustrated in FIGS. 5A and 5B which show a feeding apparatus in the form of bowl 500. FIG. 5A illustrates a perspective view of bowl 500 while FIG. 5B illustrates a top view of bowl 500. Bowl 500 includes base 502, outer side wall 504 and a plurality of protrusions 510 extending into feeding well 508. Bowl 500 includes central hub 506, so protrusions 510 extend into feeding well 508 from the surfaces of inner side wall 505, bottom 514, and central hub 506. Protrusions 510 have a triangular cross-sectional shape.

Figure 6:
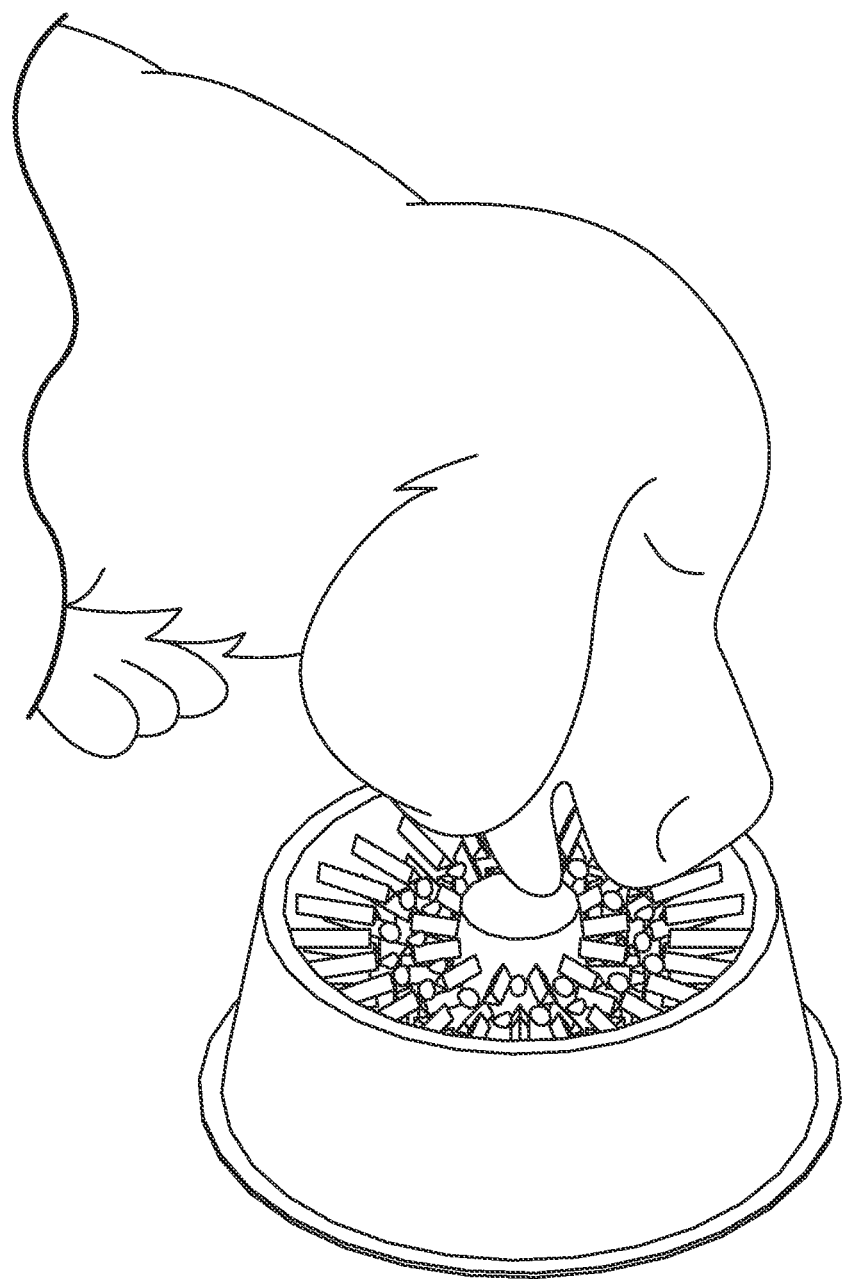
FIG. 6 illustrates a drawing of a dog feeding from one embodiment of the invention.

FIG. 6 illustrates a drawing of a dog feeding from one embodiment of the invention.

Figure 7A:
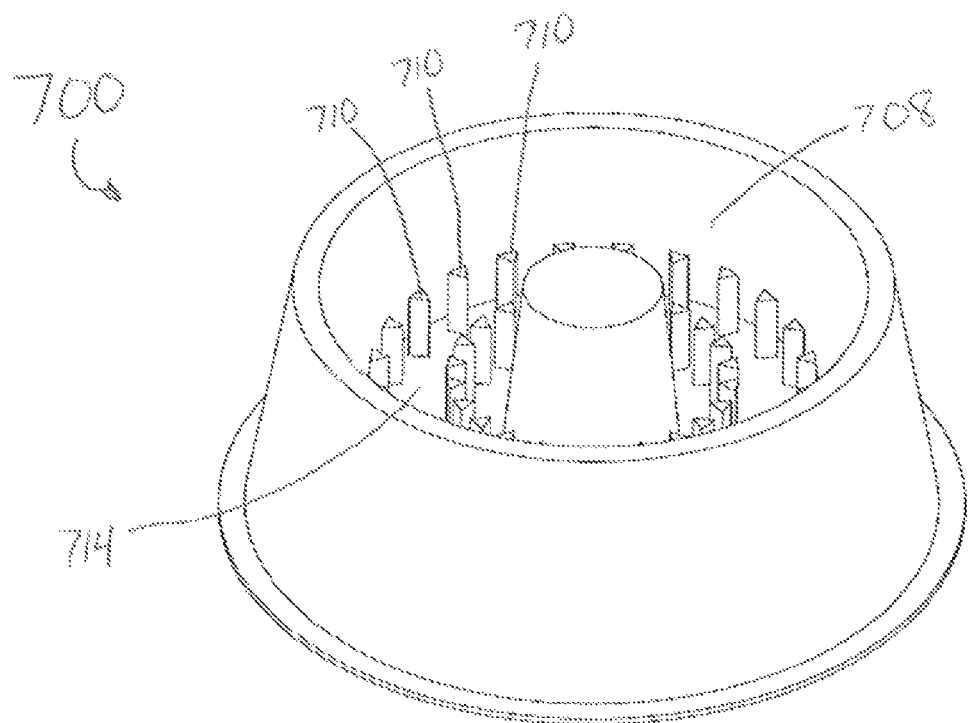
FIG. 7A illustrates a perspective view of the top of a bowl of the invention.
Figure 7B:
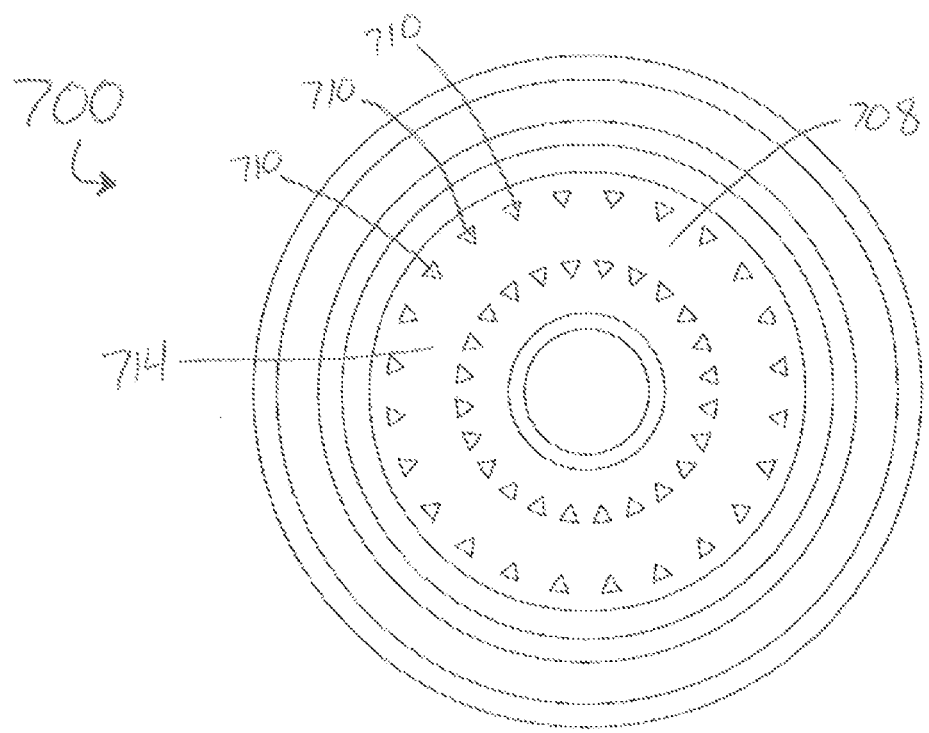
FIG. 7B illustrates a top view of the bowl of FIG. 7A.

FIGS. 7A and 7B illustrate an embodiment of the invention that includes bowl 700. Bowl 700 is similar in most regards to bowl 100 illustrated in FIGS. 1A-1F, but one difference between bowl 700 and bowl 100 is that bowl 700 includes a plurality of triangular-shaped protrusions 710 that extend info feeding well 708 only from the surfaces of bottom 714.

Figure 8A:
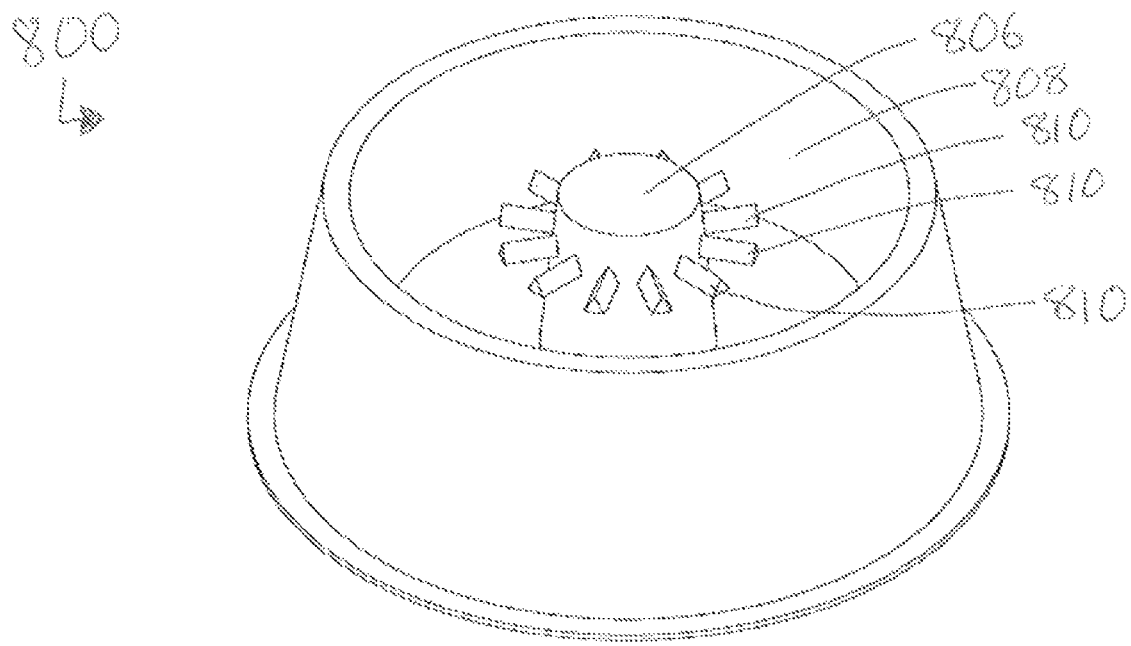
FIG. 8A illustrates a perspective view of the top of a bowl of the invention.
Figure 8B:
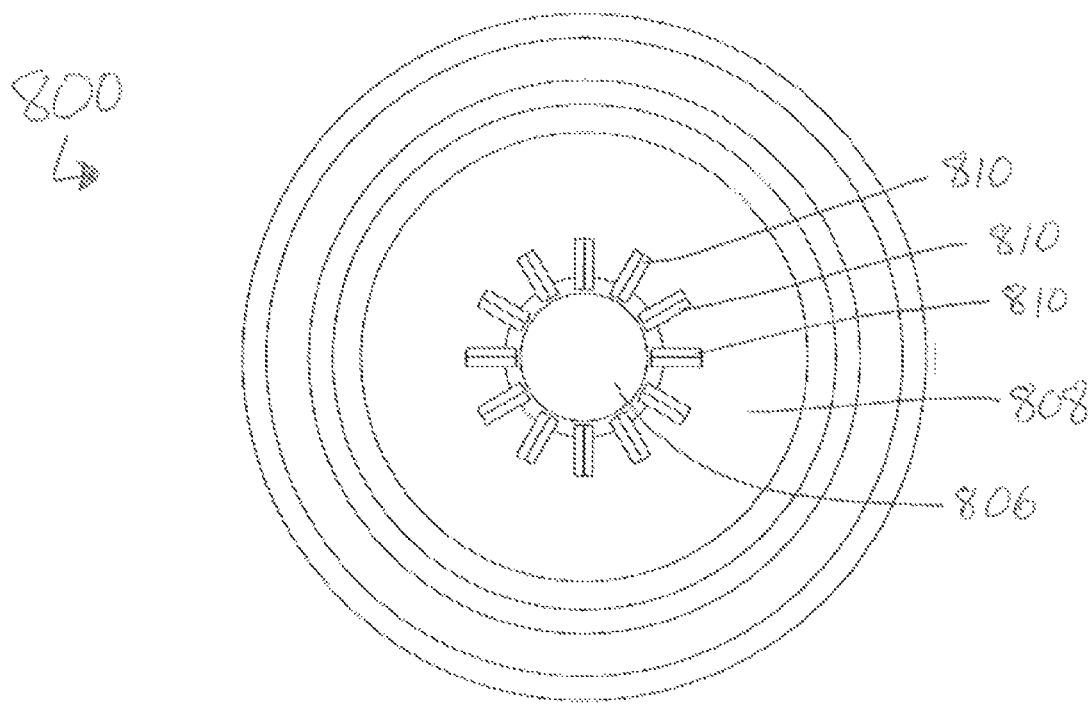
FIG. 8B illustrates a top view of the bowl of FIG. 8A.

FIGS. 8A and 8B illustrate an embodiment of the invention that includes bowl 800. Bowl 800 is similar in most regards to bowl 100 illustrated in FIGS. 1A-1F, but one difference between bowl 800 and bowl 100 is that bowl 800 includes a plurality of triangular-shaped protrusions 810 that extend into feeding well 808 only from the surfaces of central hub 806.

Figure 9A:
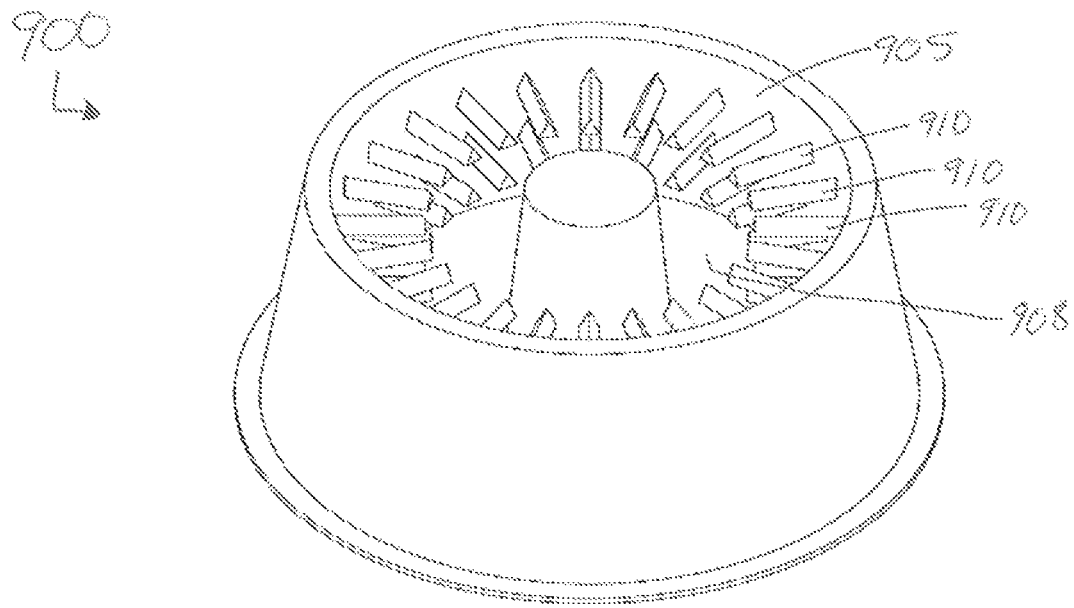
FIG. 9A illustrates a perspective view of the top of a bowl of the invention.
Figure 9B:
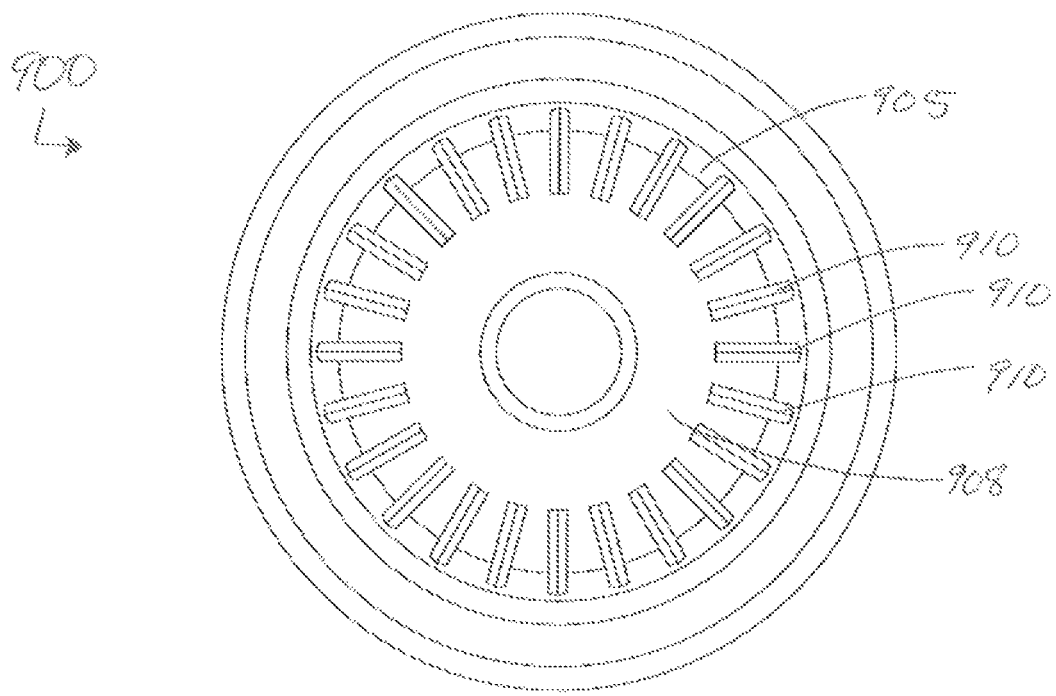
FIG. 9B illustrates a top view of the bowl of FIG. 9A.

FIGS. 9A and 9B illustrate an embodiment of the invention that includes bowl 900. Bowl 900 is similar in most regards to bowl 100 illustrated in FIGS. 1A-1F, but one difference between bowl 900 and bowl 100 is that bowl 900 includes a plurality of triangular-shaped protrusions 910 that extend into feeding well 908 only from the surfaces of side wall 905.

In some embodiments, the invention includes a bowl that includes an overlay having protrusions. For example, the bowl may be a typical feeding dish for a canine with side walls and feeding well with an overlay positioned on the bowl that includes protrusions extending into the feeding well. The overlay can be flexible and can conformably couple with the underlying bowl.

In some embodiments, the invention includes an animal feeding apparatus that includes a bowl that includes a base and a side wall. The bowl defines a feeding well and the bowl includes a plurality of protrusions extending into the feeding well and configured to visibly deflect when an animal feeds from the well and presses against the protrusions.

In some embodiments, the invention includes a feeding apparatus having features to resist movement when an animal feeds. For example, a large dog that feeds aggressively may cause the bowl to move or even upend the bowl entirely. To avoid this, the feeding apparatus of the present invention can optionally include non-skid materials on their base to prevent sliding and/or dense materials to weigh the bowl down. For example, in some embodiments of the invention, the bowl includes a portion of metal secured under the base or forming an inner portion of a central hub so that the bowl is heavier and less apt to be moved by a feeding animal.

Figure 10:
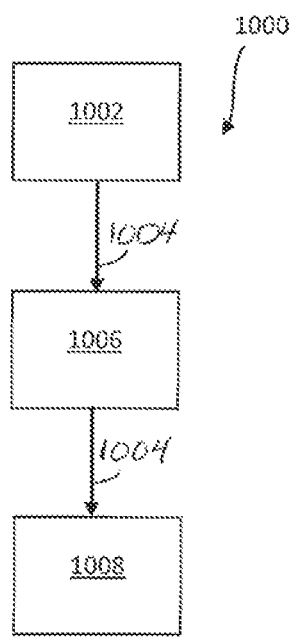
FIG. 10 illustrates a visual representation of one embodiment of a method of the invention.

In some embodiments, the invention include methods of cleaning the teeth of a mammal. The methods include providing an animal feeding apparatus as described herein, directing food into the feeding well, and allowing the mammal to consume the food in the feeding well, wherein the protrusions clean the teeth of the mammal as the mammal consumes the food. In some embodiments, the food is directed into the feeding well by an automatic feeding system while in others the food is directed into the feeding well manually. In some embodiments, the methods include removing at least some of the protrusions before the food is directed into the feeding well. For example, the protrusions that are removed may be worn due to previous use and are replaced by new protrusions. In some embodiments, the protrusions are removed as part of a cleaning process. FIG. 10 illustrates a simplified visual representation 1000 of one embodiment of a method of the invention. Automatic feeding system 1002 deposits food 1004 into the feeding well of bowl 1006. Optionally, food 1004 is deposited into the feeding well of bowl 1006 manually. Food 1004 is then consumed by dog 1008. The protrusions of bowl 1006 clean the teeth of dog 1008 as it consumes food 1004.

In some embodiments, this invention includes an animal whose teeth are cleaned using the methods described herein. In some embodiments, the animal is not a human. In further embodiments, the animal is a dog or a cat.

Below are some statements on various aspects of the present invention:

Statement 1: This invention includes an animal feeding apparatus comprising a bowl that includes a base and a side wall, wherein the bowl defines a feeding well; a plurality of protrusions extending into the feeding well from the base and from the side wall of the bowl.

Statement 2: The invention according to Statement 1, wherein the base of the bowl is less than 2 feet wide.

Statement 3: The invention according to Statements 1 or 2, wherein the bowl further includes a central hub.

Statement 4: The invention according to any of the Statements 1-3, wherein the central hub is removable.

Statement 5: The invention according to any of the Statements 1-4, wherein protrusions extend into the feeding well from the central hub.

Statement 6: The invention according to any of the Statements 1-5, wherein the side wall of the bowl defines a circular shape.

Statement 7: The invention according to any of the Statements 1-5, wherein the side wall of the bowl defines a rectilinear shape.

Statement 8: The invention according to any of the Statements 1-7, wherein the bowl is made of a metallic material.

Statement 9: The invention according to any of the Statements 1-8, wherein the bowl is made entirely of polymeric materials.

Statement 10: The invention according to any of the Statements 1-9, wherein at least a portion of the plurality of protrusions are spaced apart from one another by a distance of between about 0.5 centimeters and about 2.6 centimeters.

Statement 11: The invention according to any of the Statements 1-10, wherein at least some of the protrusions define a triangular cross-sectional shape.

Statement 12: The invention according to any of the Statements 1-11, wherein at least some of the protrusions define a circular cross-sectional shape.

Statement 13: The invention according to any of the Statements 1-12, wherein at least some of the protrusions extend into the feeding well a distance of between about 0.9 and about 3.2 centimeters.

Statement 14: The invention according to any of the Statements 1-13, wherein at least some of the protrusions include a radial thickness that is between about 0.15 centimeters and about 0.7 centimeters.

Statement 15: The invention according to any of the Statements 1-14, wherein at least a portion of the protrusions have a length to radial thickness ratio of between 20:1 and 2:1.

Statement 16: The invention according to any of the Statements 1-15, wherein at least some of the protrusions define a first radial thickness at a first location and a second radial thickness at a second location, wherein the first radial thickness is greater than the second radial thickness.

Statement 17: The invention according to Statements 16, wherein the first location is more proximal to the bowl than the second location.

Statement 18: The invention according to any of the Statements 1-17, wherein at least some of the protrusions include bristles.

Statement 19: The invention according to any of the Statements 1-18, wherein at least some of the protrusions include a surface that is textured (i.e., the surface is not smooth).

Statement 20: The invention according to any of the Statements 1-19, wherein at least some of the protrusions extend from the base or side wall at an acute angle.

Statement 21: The invention according to any of the Statements 1-19, wherein at least some of the protrusions extend from the base or side wall at a right angle.

Statement 22: The invention according to any of the Statements 1-21, wherein at least some of the protrusions are integrally formed with the bowl.

Statement 23: The invention according to any of the Statements 1-22, wherein at least some of the protrusions are not integrally formed with the bowl.

Statement 24: The invention according to any of the Statements 1-23, wherein at least some of the protrusions are replaceable without destroying the other components of the bowl.

Statement 25: The invention according to Statement 24, wherein two or more of the protrusions that are replaceable are formed from a single piece of material.

Statement 26: The invention according to any of the Statements 1-25, wherein all of the protrusions extending from the base are formed from a single piece of material.

Statement 27: The invention according to any of the Statements 1-26, wherein at least some of the protrusions include a flavoring agent, a cleaning agent, a polishing agent, or a pharmaceutical agent.

Statement 28: The invention includes an animal feeding apparatus comprising a bowl that includes a base and a side wall, wherein the bowl defines a feeding well; a plurality or protrusions extending into the feeding well from an overlay that is removably secured over the bowl.

Statement 29: The invention includes an animal feeding apparatus comprising a bowl that includes a base and a side wall, wherein the bowl defines a feeding well; and a plurality of protrusions extending into the feeding well and configured to visibly deflect when an animal feeds from the well and presses against the protrusions.

Statement 30: The invention includes a method of cleaning the teeth of a mammal, the method comprising providing an animal feeding apparatus according to any of Statements 1-29; directing food into the feeding well; and allowing a mammal to consume the food in the feeding well, wherein the protrusions clean the teeth of the mammal as the mammal consumes the food.

Statement 31: The invention according to Statement 30, wherein the food is directed into the feeding well by an automatic feeding system.

Statement 32: The invention according to Statement 30 or 31, further including removing at least some of the protrusions before the food is directed into the feeding well.

Statement 33: The invention according to any of Statements 30-32, wherein the protrusions that are removed are worn due to previous use and are replaced by new protrusions.

Statement 34: The invention according to any of the Statements 30-33, wherein the protrusions are removed as part of a cleaning process.

Statement 35: The invention includes an animal whose teeth are cleaned using the methods of any of Statements 30-34.

Statement 36: The invention according to Statement 35, wherein the animal is not a human.

Statement 37: The invention according to either Statement 35 or 36, wherein the animal is a dog or cat.

Statement 38: The invention according to Statement 37, wherein the animal is a dog.

Statement 39: The invention according to any of Statements 1-38, wherein at least some portion of the protrusions have a hardness of between about 30 D to 80 D.

The above description is intended to be illustrative, and not restrictive. Other embodiments can be used, such as by one of ordinary skill in the art upon reviewing the above description. For example, elements of one described embodiment may be used in conjunction with elements from other described embodiments. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment.

Thus, the following claims are hereby incorporated into the Detailed Description, with each claim standing on its own as a separate embodiment. The scope of the invention should be determined with reference to the appended claims, along with the full scope of equivalents to which such claims are entitled. As used herein, the terms "including" are used as equivalents of the terms "comprising" and "wherein".

In this document, the terms "a" or "an" are used to include one or more than one, independent of any other instances or usages of "at least one" or "one or more". In this document, the term "or" is used to refer to a nonexclusive or, such that "A, B or C" includes "A only", "B only", "C only", "A and B", "B and C", "A and C", and "A, B and C", unless otherwise indicated. In the appended aspects or claims, the terms "first", "second" and "third", ect. are used merely as labels, and are not intended to impose numerical requirements on their objects. It shall be understood that any numerical ranges explicitly disclosed in this document shall include any subset of the explicitly disclosed range as if such subset ranges were also explicitly disclosed; for example, a disclosed range of 1100 shall also include the ranges 1-80, 2-76, or any other numerical range that falls between 1 and 100. In another example, a disclosed range of "1,000 or less" shall also include any range that is less than 1,000, such as 50-100, 25-29, or 200-1,000.

The Abstract is provided to comply with 37 C.F.R. §1.72 (b), to allow the reader to quickly ascertain the nature of the technical disclosure. It is submitted with the understanding that it will not be used to interpret of limit the scope or meaning of the claims.

What is claimed is:

1. An animal feeding apparatus comprising: a bowl that includes a base and a side wall, wherein the bowl defines a feeding well with a bottom surface and an inner side wall surface; and a plurality of elongated and flexible protrusions extending into the feeding well, wherein the protrusions are configured to readily move relative to the bowl when a mammal forces its teeth against the protrusions as the mammal consumes food from the feeding well, wherein protrusions extend into the feeding well from the bottom surface of the feeding well, and wherein the bowl further includes a central hub extending upwardly from the bottom surface of the feeding well and wherein flexible protrusions extend into the feeding well from the central hub.

2. The apparatus of claim 1, wherein the side wall of the bowl defines a circular shape.

3. The apparatus of claim 1, wherein at least some of the protrusions are spaced apart from a nearest neighboring protrusion by a distance of between 0.5 centimeters and 2.6 centimeters.

4. The apparatus of claim 1, wherein at least some of the protrusions define a triangular cross-sectional shape.

5. The apparatus of claim 1, wherein at least some of the protrusions define a circular cross-sectional shape.

6. The apparatus of claim 1, wherein at least some of the protrusions extend into the feeding well a distance of between 0.9 centimeters and 3.2 centimeters.

7. The apparatus of claim 1, wherein at least some of the protrusions define a radial thickness of between 0.15 centimeters to 0.7 centimeters.

8. The apparatus of claim 1, wherein the protrusions have a length to radial thickness ratio of between 20:1 and 2:1.

9. The apparatus of claim 1, wherein at least some of the protrusions define a first radial thickness at a first location and a second radial thickness at a second location, wherein the first radial thickness is greater than the second radial thickness and wherein the first location is more proximal to the bowl than the second location.

10. The apparatus of claim 1, wherein at least some of the protrusions include a surface that is textured or at least some of the protrusions include bristles.

11. The apparatus of claim 1, wherein at least some of the protrusions are integrally formed with the bowl.

12. The apparatus of claim 1, wherein at least some of the protrusions are not integrally formed with the bowl and are replaceable.

13. The apparatus of claim 1, wherein at least some of the protrusions include a flavoring agent, a cleaning agent, a polishing agent, or a pharmaceutical agent.

14. The apparatus of claim 1, wherein each of the plurality of protrusions extend into the feeding well with a length and a radial-thickness and wherein the ratio of the length to radial-thickness of each of the plurality of protrusions is between 22:1 and 1:1, and wherein each of the plurality of protrusions include a major cross-sectional dimension and wherein the length of each of the plurality of protrusions is between 1.2 centimeters and 3.2 centimeters and the major cross-sectional dimension of each of the plurality of protrusions is between 0.25 centimeters and 0.4 centimeters along the length, and wherein each of the plurality of protrusions is made from a material having a hardness of between 50 D and 70 D.

15. The apparatus of claim 1, wherein protrusions extend through or are secured to the bottom surface of the feeding well.

16. An animal feeding apparatus comprising: a bowl that includes a base and a side wall, wherein the bowl defines a feeding well with a bottom surface and an inner side wall surface, wherein the bowl further includes a central hub extending upwardly from the bottom surface of the feeding well and wherein flexible protrusions extend into the feeding well from the central hub; and a plurality of elongated and flexible protrusions extending into the feeding well, wherein the protrusions are configured to readily move relative to the bowl when a mammal forces its teeth against the protrusions as the mammal consumes food from the feeding well, wherein protrusions extend into the feeding well from the bottom surface of the feeding well, wherein the plurality of protrusions are part of an overlay layer that is removably secured over the bowl.

17. The apparatus of claim 16, wherein each of the plurality of protrusions extend into the feeding well with a length and a major cross-sectional dimension and wherein the length of each of the plurality of protrusions is between 0.9 and 3.2 centimeters and the major cross-sectional dimension of each of the plurality of protrusions is between 0.15 centimeters and 0.7 centimeters along the length.

18. The apparatus of claim 16, wherein each of the plurality of protrusions is made from a material having a hardness of between 30 D and 80 D.

\* \* \* \* \*